(12) United States Patent  
Dietz et al.

(10) Patent No.: US 6,498,590 B1  
(45) Date of Patent: Dec. 24, 2002

(54) MULTI-USER TOUCH SURFACE

(75) Inventors: Paul H. Dietz, Hopkinton, MA (US); Darren L. Leigh, Belmont, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/864,833

(22) Filed: May 24, 2001

(51) Int. Cl.[7] .............................................. H01Q 21/00
(52) U.S. Cl. ........................ 343/893; 343/853; 323/904
(58) Field of Search .................... 343/700 MS, 718, 343/812, 841, 853, 893; 370/401, 465, 466, 480, 481; 323/904; 340/286.1, 286.2

(56) References Cited

U.S. PATENT DOCUMENTS 6,335,678 B1 * 1/2002 Heutschi ................ 340/286.01  
6,341,133 B1 * 1/2002 Kawamoto et al. ......... 370/352

\* cited by examiner

*Primary Examiner*—Tan Ho  
(74) *Attorney, Agent, or Firm*—Dirk Brinkman; Andrew J. Curtin

(57) ABSTRACT

A multi-user touch system includes a surface on which are a pattern of mounted antennas. A transmitter transmits uniquely identifiable signals to each antenna. Receivers are capacitively coupled to different users, the receivers are configured to receive the uniquely identifiable signals. A processor then associates a specific antenna with a particular users when multiple users simultaneously touch any of the antennas.

26 Claims, 3 Drawing Sheets

MULTI-USER TOUCH SURFACE

FIELD OF THE INVENTION

The present invention relates generally to the field of touch sensitive surfaces, and more particularly to large-scale, multi-user touch surfaces.

BACKGROUND OF THE INVENTION

Touch screens are widely used to present a user with an intuitive pointing interface. For example, touch screens are used in automatic teller machines, scientific and industrial control devices, public kiosks, and hand held computing devices, to name but a few common touch applications. Touch screens can use resistive, capacitive, acoustic, or infrared sensors. In most touch screen applications, the touch sensitive surface is permanently mounted on a display device such as a cathode ray tube (CRT), or a liquid crystal display (LCD).

During operation of most prior art touch screens, a formatted image is rear projected through the touch screen while a transmitter drives signals across the x- and y-axis of the touch screen. As the user touches the screen with a finger or stylus, pointing out specific parts of the image, receivers detect the location of specific x- and y-coordinates of where the screen is touched. The receivers are coupled to processes that can then take appropriate actions in response to the touching and the currently displayed image.

Recently, there has been interest in extending touch technologies to electronic whiteboard applications. There, the main difference is one of scale. As stated above, traditional touch screen are designed for use with small displays and a single user, whereas whiteboards are large displays, generally used in group situations.

While it is possible to scale up touch screen, specifically with acoustic signals, prior art touch screens do not differentiate among the touches by multiple users. Also, most prior art touch screen cannot distinguish multiple, none identify simultaneous touches by one or multiple users.

While electronic whiteboards are useful for group discussions, turning the interactive surface into a table that a number of users can be seated around would facilitate longer work sessions. A problem with this arrangement is that users tend to put items on tables, such as books, paper, and cups. For pressure sensitive surfaces, static objects generate spurious touch points. In a single touch system, any such object causes the surface to malfunction.

Therefore, an improved interactive touch surface should have the following characteristics: detects multiple, simultaneous touches, detects which user is touching each location, objects left on the touch surface should not interfere with normal operation, withstand normal use without frequent repair or recalibration, not require additional devices, e.g. no special stylus, body transmitters, and the like, and be inexpensive.

SUMMARY OF THE INVENTION

It is an object of the invention to provide a multi-user, large-scale touch surface. It is another object of the invention to provide a touch system that can uniquely associate multiple simultaneous touches with multiple users. It is also an object of the invention to differentiate multiple simultaneous touches by a single user. It is also desired to have a touch surface that can operate independent of a display device.

The invention provides a multi-user touch system that includes a touch sensitive surface with touch sensitive locations. The basic idea behind the invention is to have the users complete a capacitively coupled circuit running from the touch point on the touch surface to devices embedded in the environment. For example, an interactive display table contains an array of antennas, each transmitting a unique signal. When a user touches near a particular antenna, the transmitted signal is capacitively coupled to that user. If the user is sitting or standing on a conducting electrode, the signal will also be capacitively coupled to that electrode. A receiver connected to that electrode can thus detect which antennas the user is touching near. Of course, the system can also work in reverse, with the table being an array of receiving antennas and the user coupling signal from a unique transmitter in a chair or floor plate.

With proper design, capacitive coupling through the human body is reliable. One consideration is to operate via "near field," i.e., capacitive, coupling. By limiting the transmitting frequencies so that the antennas are very short compared with a quarter wavelength, very little energy is radiated. Thus, for reasonable sized tables, frequencies are in the sub-MHz. range to prevent EMI compatibility problems.

More particularly, a transmitter is coupled to multiple antennas mounted on a surface to transmit uniquely identifiable signals to the antennas. Receivers are capacitively coupled to different users, and configured to receive the uniquely identifiable signals. When multiple users simultaneously touch any of the antennas, each touched antenna is associated with a particular user.

DETAILED DESCRIPTION OF THE PREFERRED EMBODIMENTS

Our invention provides a touch sensitive system that enables multiple users to simultaneously touch a surface, and to associate the location of each touch or multiple simultaneous touches with a specific user. Our touch system capacitively couples a signal between locations on the touch surface and users so that unique touched locations can be identified with specific users. Thus, multiple users can simultaneously interact with a touch surface.

System Structure

Figure 1:
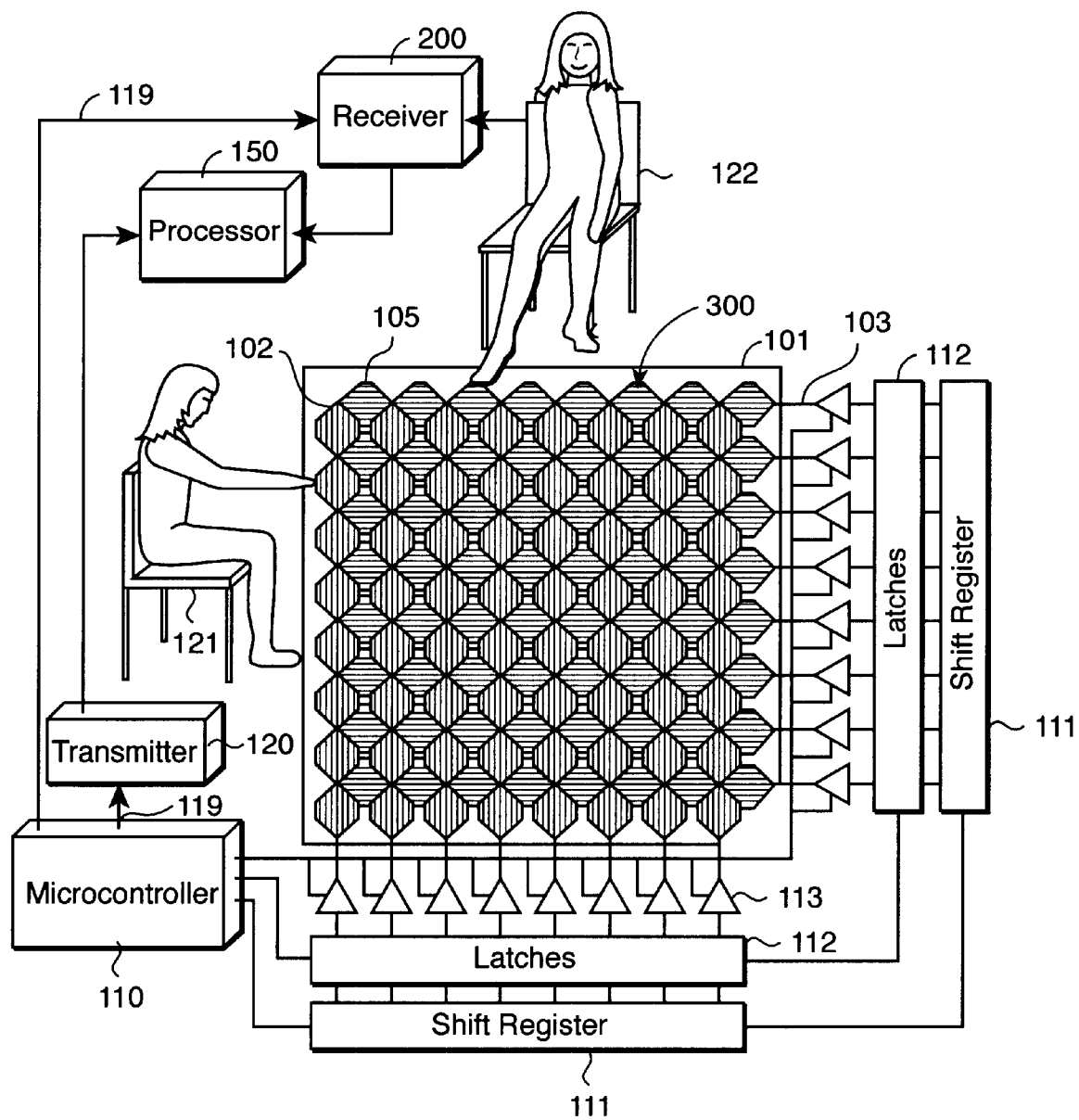
FIG. 1 is a schematic of a multi-user touch screen according to the invention.

As shown in FIG. 1, a preferred embodiment of our invention can use a tabletop 101 to display an arbitrary image, not shown. The tabletop is fitted with conductive rows 102 and columns 103 of touch sensitive pads 105. The pads, as will be described in greater detail act as antennas. The conductive touch pads 105 form a touch sensitive surface 300 that coincides with the displayed image. In the arrangement shown, the rows and columns are arranged in a diamond pattern, although it should be understood that other geometric patterns are also possible, as described below.

The conductive rows and columns of pads can be deposited on, for example, a laminated substrate using techniques similar to those used to fabricate printed circuit boards. The size and separation of the touch pads determine the effective resolution of the touch locations.

A transmitter 120 individually supplies uniquely identifiable electronic signals, described below, to the rows and columns of touch pads. As shown, the transmitter 120 includes a microprocessor 110, shift registers 111, latches 112, and drivers 113. There is a set of registers, latches, and drivers for the for the rows and columns of touch pads 105.

In addition, there are chairs 121–122 arranged around the table, one for each user. The chairs include conductive parts, for example, the arms, legs, or seat. The conductive parts of each chairs are electrically connected to individual receivers 200. It should be understood that other conductive items can also be used to identify users, e.g. conductive floor mats, wristbands, belts, etc. However, we prefer conductive chairs because they form a non-obtrusive, natural setting where users can easily operate the system in comfort. The receivers 200 are coupled to a processor 150 that controls the overall operation of the system 100. See FIG. 4 for a simplified schematic of the system of FIG. 1.

Figure 2:
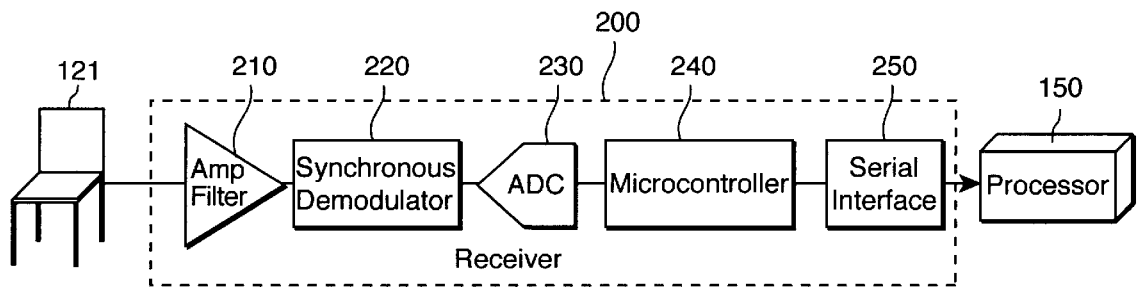
FIG. 2 a block diagram of a receiver according to the invention.

FIG. 2 shows the receiver 200 in greater detail. The receiver 200 includes an amplifier 210 connected to a synchronous demodulator 220. The output of the demodulator is coupled to an analog-to-digital convertor 200, which in turn is coupled to a microprocessor 240. The microprocessor receives synchronization signals 119 from the microcontroller 110 of the transmitter, and produces location coordinates for the processor via a serial, e.g., RS-232, interface 250.

Figure 3:
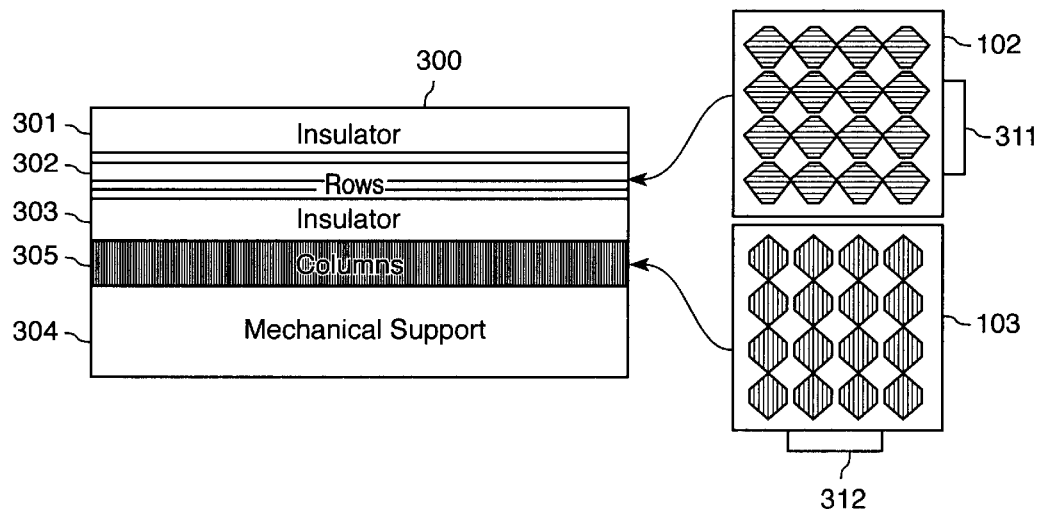
FIG. 3 is a block diagram of a touch screen used in one embodiment of the present invention.

FIG. 3 shows the details of the touch sensitive surface 300. In one embodiment of the invention, the touch surface is constructed as a two-layer printer circuit board with edge connectors 311–312 connected to the respective drivers 113. The layers include a first insulator layer 301, a row layer 302, a second insulator layer 303, a column layer 304, and a mechanical support layer 305.

Antenna Patterns

There are a number of antenna patterns possible for the touch sensitive surface or antennas. Here we describe the more interesting ones. In a "full matrix" pattern, there are a very large number of antennas arranged in a regular grid. Such a matrix of individually driven antenna "pixels" allows an unambiguous determination of multiple touch locations, even for a single user.

Minor variations on the full matrix include the use of hexagons, triangles or some other tessellating geometry. There is no reason why the antennas must be on a flat surface. For some applications, the surface can conform to any appropriately shaped object. It such cases irregular patterns of antennas may be desired. Highly irregular patterns might also be useful for some applications where the pattern corresponds to some arbitrary image.

In practice, the full matrix pattern may not be needed for many applications. Although the simultaneous, multi-user feature is desired, perhaps it is sufficient for each user to indicate at most a single touch point, or a bounding box. This functionality can be obtained with a simple row and column pattern, as shown in FIG. 1, that drastically reduces the number of antennas.

Designing a row/column pattern is not trivial. The problem is that antennas also shield. So arranging a sheet of row conductors (antennas) and then covering the conductors with a sheet of column conductors will shield the row conductors anywhere they overlap. We have found the connected diamond pattern shown in FIG. 1 to be a good choice. This pattern has the interesting property that the row conductors are identical to the column conductors, rotated by ninety degrees. This allowed us to design a single conductor pattern and use it for both rows and columns, saving manufacturing costs.

In practice, a user's touch will most likely span multiple rows and multiple columns with different degrees of coupling. These can be used to estimate a centroid for the point of touch, to obtain location with a higher resolution than the row and column spacing. However, an alternative way of using this information is to present a bounding box for the touch event, defined by the min and max rows and columns of antennas significantly coupled.

This leads to an interesting use of the device. A single user can touch two points to define a bounding box. This is a very natural way of selecting a rectangular area in graphics design systems. In practice, we suggest using two modes of operation: when the coupled area is small, presume the user is indicating a point, when the coupled area it large, presume that the user is trying to specify a bounding box. The end result is that even this simplified row/column design allows simultaneous multi-touch use for all users.

Of course, it would be an advantage when the row/column pattern can distinguish multiple touches from a single user. The problem is that given two X and two Y coordinates, the system cannot tell if the intended touches are (X1, Y1) and (X2, Y2) or (X1, Y2) and (X2, Y1). In most cases, timing information can be used to disambiguate the two cases. If (X1, Y1) and (X2, Y2) are coupled successively, we can estimate the pairings.

Analog Antennas

The purpose of the antenna arrays (conductive touch pads) is to generate coupling patterns that are location dependent in a simple manner. Alternatively, this can be accomplished using resistive sheets driven from multiple points.

The easiest way to think about this is to consider a one-dimensional case. A resistive strip is driven by an oscillator, first on one end, and then on the opposite end, each time grounding the undriven side. This produces a signal that linearly decreases in amplitude moving towards ground. Switching the driven side flips the direction of this linear drop. By looking at the ratio of the coupled signal during the two cases, touch locations can be determined.

This can be extended to multiple dimensions. Signals can be applied so as to drop linearly in the X dimension and then in the Y dimension. However, this cannot be accomplished by merely putting strip conductors on the edge of a resistive sheetthe unused conductors will short along the desired dimension. One partial solution is to break the strip conductors into a series of small connection points that can be disconnected when driving the other axis. A more practical approach places the conductors in the four corners, and calibrate for the non-linear field patterns that result.

System Operation

During operation, images can be projected onto the table. The projection can be overhead projection, or rear projection when the touch surface is transparent or translucent. For many applications, such as, games or industrial control, the image can be fixed on the touch sensitive surface by other means, or a mix of fixed and projected images can be used. If the touch surface is mounted on a wall, as described below, the projection can be conventional, or any other projection means can be used.

In the case the surface is mounted on a table top, users sitting in the conductive chairs 121–122 cause a capacitive coupling between the transmitter and the receivers 200 when the touch surface is touched by a body part, e.g., fingers or toes, or a conductive pointers held by the users. In effect, the user couples the transmitter to the receivers via the touch screen.

The coupled signal is analyzed to determine the locations that are capacitively coupled to each chair and hence the unique locations pointed at by each seated user can be identified.

Figure 4:
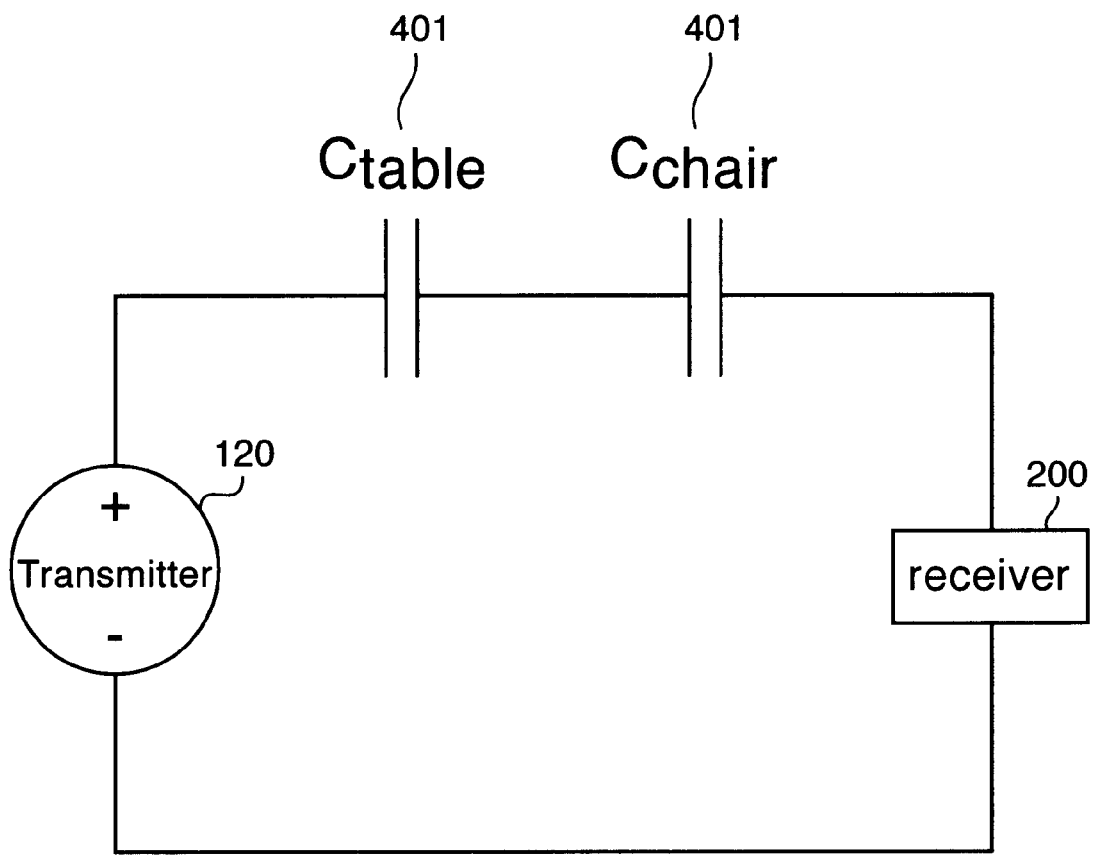
FIG. 4 is a schematic of the capacitive coupling according to the invention.

The system can be understood with the aid of a simplified equivalent circuit as shown in FIG. 4. $C_{table}$ 401 represents the capacitance between the user's finger and a transmitting antenna of the surface. $C_{chair}$ 402 represents the capacitance between the user and a conducting chair. The coupling capacitance is the series combination of these two capacitances:

$$C_{coupling}=(C_{table}*C_{chair})/(C_{table}+C_{chair})$$

Because the coupling area of a finger is very small compared to the entire upper torso in a conducting chair, $C_{table}$ tends to be very small compared to $C_{chair}$. Thus, the $C_{coupling}$ is approximately equal to $C_{table}$. This means that the precise capacitive coupling via the chair is inconsequential. In the case the coupling is via a conducting floor plate, the coupling area of feet is far smaller, but still very large compared to a finger. One might think that thick-soled shoes might be problematic because they dramatically increase the spacing between the conductors. However, we have found that we get more than sufficient coupling, partially because the thick rubber soles have a high dielectric constant increasing the capacitance.

For the system to work well, we prefer fairly independent coupling paths among the users. This constraint is violated if two or more users, or their chairs are touching, or are in very close physical proximity. In this regard, social norms of "personal space" are sufficient to keep the inter-user coupling acceptably small.

However, this behavior can be explicitly exploited. By touching another user, or the user's chair, the touches of either user are interpreted as touches for both users. Typically, the coupling "through" a second user is considerably weaker, and thus it is possible to determine a "primary" user versus "shared" users. This provides a simple and intuitive mechanism for users to jointly indicate a selection.

As noted above, the system can work in one of two ways—the touch surface can be a large array of antennas transmitting uniquely identifiable signals to a small number of receivers associated with particular users, or a large array of antennas receiving a small number of uniquely identifiable signals from transmitters associated with particular users. We have found the former to be a superior configuration for a number of reasons. Primary, the transmitter can be driven with logic level signals that are easy to generate in large number. Receivers are somewhat more complex to implement. Thus, we chose the configuration that minimizes the number of receivers.

There are many ways of generating uniquely identifiable signals, as described in detail below. In signal processing terms, we can use an orthogonal set of signals. For example, every antenna is driven at a different frequency. A receiver that is coupled to a number of antennas then identifies a particular user by examining the spectrum of the received signal. However, generating the numerous frequencies required for a large array can be relatively expensive.

Time division multiplexing is another option. In this case, each antenna is separately driven in turn by a fixed frequency, and the timing of the received signals is used to determine which antennas are presently coupled. This system is very simple to implement because the receivers are particularly simple because they are looking for a single frequency. However, this technique may not be appropriate for very large arrays. The problem is a fairly subtle one caused by the interplay of the various constraints.

For high responsivity, the entire array must be scanned ten to a hundred times per second. However, as noted above, practical modulating frequencies are limited to the sub-MHz. range. This leaves very few modulation cycles per antenna, making receiver design difficult, especially considering of other interfering sources of noise.

There are ways of reducing the scan time that help to extend the practicality of time division multiplexing schemes. Large numbers of antennas can be driven simultaneously to see if there is coupling from any of them. Thus, binary search patterns may be used to locate particular touch points in roughly logarithmic time. However, this is not as straight forward as at first implied. In general, there will be degrees of coupling to multiple antennas, so in practice, these searches narrow down the candidate areas, which are then searched exhaustively.

As anyone familiar with telephone systems will note, in addition to time and frequency division multiplexing, code division multiplexing can be considered. In fact, this turns out to be a particularly elegant approach for large arrays. A simple generating polynomial is used to generate a pseudo random bit sequence with the property that the autocorrelation of this sequence is extremely small everywhere except at zero. This sequence is then fed into a long shift register to generate a binary tapped delay line with one tap per an antenna. The taps directly modulate the antennas. The receiver then cross-correlates the received signal with the original sequence. Each lag in the cross-correlation signal corresponds to the coupling from a particular antenna. This allows all of the couplings to be determined by a single calculation.

The advantage of this code division multiplexing scheme is that it scales extremely well to large numbers of antennas. Adding antennas merely requires adding extra taps on the shift register. On the receiver side, FFT and other techniques can dramatically decrease the difficulty of the cross-correlation calculation. Unlike time division multiplexing, the effective antenna integration time remains long and constant with increasing number of antennas, avoiding noise issues.

Transmitting and Receiving

The capacitive coupling of our system relies on near field coupling. Therefore, far field radiation by the touch sensitive screen should be minimized to maximize the signal to noise ratio (SNR) at the receivers 200. For this reason, the frequencies of the transmitted signals are kept low, e.g., under 1 MHz for practical table sizes. This has an important impact on the design of the system. At lower frequencies, integration time required at the receiver increases to achieve a usable SNR. As an advantage the frequencies are well below frequencies of the radio spectrum, making our system useable in environments where RF signals could interfere with the operation of other equipment.

Time Division Multiplexing

In a time division multiplexed transmitting scheme, each row and then each column of pads is individually driven, in turn, so that the number of individual transmitters can be relatively small. By measuring the times when the transmitted signals are present at the receivers 200, the rows and columns coupled are readily differentiated. This can be accomplished with the synchronization signals 119.

Code Division Multiplexing

Time synchronized signals are not the only easily separable signals. With code division multiplexing, orthogonal spreading codes at the transmitter allow multiple signals to occupy the same frequency bandwidth. In the receivers 200, the multiple signals are then separated by correlating them with the original spreading code. With a properly chosen pseudo random noise (PRN) bit sequence, the autocorrelation function is very small everywhere except at zero.

Thus, by driving each row and column of pads by the same PRN bit sequence, but each sequence with a unique time delay, received signals can easily be separated by cross-correlating with the original sequence.

Therefore, a single PRN bit sequence is generated for the transmitter using a polynomial function. The PRN sequence is passed through a shift register to provide time delays. Then, the transmitted signals are spread by the PRN sequence from taps off the shift register and transmitted by the different receivers.

The code division multiplexed scheme has many advantages. First, locations on the entire table can be determined by one cross-correlation per receiver. Second, the effective integration time can be very long compared to the time division scheme. Third, the system is robust to many types of interference due to the spread spectrum operation.

Resistive Touch Screen

Rather than using detailed patterns of rows and columns pads, a single resistive substrate can also be used as the touch sensitive surface, as described above. In this case, a very small number of transmitters are used, for example one at each corner, or one at each side. The resistive drop across the substrate is different for each transmitter, so the relative amounts of signal capacitively coupled up to a user can be used to determine the touch location.

Alternative Embodiments

In an alternative embodiment, the electrical signals are driven in reverse so that the chairs 121–122 are coupled to unique transmitters, and the rows and columns are coupled to a single receiver.

In yet another embodiment, each unique location on the table can be individually coupled to a transmitter or a receiver. This arrangement enables the identification of multiple touch points by a single user.

In this design with individually addressable locations, there may not be sufficient time to integrate the signal over each location while still maintaining a reasonable overall update rate. In this case, we use a code division multiplexed scheme. By analyzing the received codes, the touch locations can be determined. Code division multiplexing allows sufficient integration time because time sliced integration for each location is not required.

Timing signals can also be used to disambiguate multiple simultaneous touches. Other geometric patters, such as a triangular mesh, also allow for multiple unambiguous touch locations. Note that the mesh spacing should be sufficiently small so that a fingertip spans at least one row and one column, yet large enough to maximize capacitive coupling.

Applications

The system according to our invention can be used in any of the interactive applications described above, but now we enable multiple users to operate the system simultaneously. In addition, the system can be used for a whole new genre of interactive games where multiple users either compete with each other, or collaborate to solve an unknown problem.

One of the key features of the system is its ability to detect multiple touches allowing a number of people to simultaneously interact with the system. For some cases, the identity of the user may be unimportant. Thus a single receiver can be used. A whimsical example can be a digital finger paint mural - a wall that allows users to finger paint messages and art that slowly change color and decay with time.

This system works by projecting digital video onto a full matrix of touch pads, with the adjacent floor being a single receiving electrode. Interestingly, the system can also be implemented with a row/column touch wall. In this case, the floor is partitioned into many separate receivers so as to provide each user with an independent coupling path. The system can scan all of these receivers for coupling, so that users can walk freely about.

The other key feature of the system according to the invention is the ability to determine which user is currently touching near the antennas. This is a very powerful feature that can be used many ways. For example, we generated a multi-player game where different colored objects appear on the surface, often simultaneously, and the player must quickly touch the objects that are a particular color. The first player to do this correctly for each object gets points credited to his or her score. Hitting the wrong color deletes points. This game is only possible via the identification feature of our invention.

The ability for simultaneous, identifying interaction opens some interesting possibilities. One of the more intriguing ideas is the ability to generate virtual personal work areas. Although the system is designed for group collaboration on a common surface, in practice, individuals may want to "break away" to briefly address some subset of the problem, and then wish to integrate their result into the whole. When these situations arise, the system can generate a virtual personal work area in front of the appropriate user that only responds to that user. The user can then manipulate objects in this space, without impacting the larger work effort of other users but for the loss of some screen space. Because these virtual personal work areas are software defined, they can be generated and destroyed on the fly, in any shape as desired.

The concept of virtual personal work areas can be extended to special "privileged objects." A privileged object is an icon that allows only certain classes of users to perform certain operations with that object. For example, a plumber and an electrician may be viewing the same house plan, but only the plumber can modify the piping and only the electrician can modify the wiring.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A multi-user touch system, comprising:
 a touch sensitive surface including a plurality of antennas mounted thereon;
 a transmitter configured to transmit uniquely identifiable signals to each antenna;
 plurality of receivers, each receiver capacitively coupled to a different user, the receivers configured to receive the uniquely identifiable signals;
 means for associating a specific antenna with a particular user when multiple users simultaneously touch any of the plurality of antennas.

2. The system of claim 1 wherein the touch sensitive surface further comprises:
   a plurality of conductive pads arranged in rows and columns.
3. The system of claim 2 wherein the plurality of conductive pads are arranged on a laminated substrate.
4. The system of claim 2 wherein the means for associating further comprises:
   means for driving the uniquely identifiable signals to each antenna in turn; and
   means for measuring times when the transmitted signals are present at the receivers to differentiate the antennas.
5. The system of claim 1 wherein each receiver further comprises:
   an amplifier connected to a synchronous demodulator;
   an analog-to-digital converter coupled an output of the synchronous demodulator.
6. The system of claim 1 wherein the transmitter and each receiver are connected to a processor for associating the specific antenna with each particular user.
7. The system of claim 1 wherein the surface is disposed on a table top.
8. The system of claim 1 wherein the surface is mounted on a wall.
9. The system of claim 1 wherein the surface conforms to an arbitrary shaped object.
10. The system of claim 1 wherein the antennas are arranged in a regular pattern.
11. The system of claim 1 wherein the antennas are arranged in an irregular pattern.
12. The system of claim 1 further comprising:
   means for associating two antennas with the particular user when the particular user simultaneously touches two antennas.
13. The system of claim 12 wherein the two antennas define a bounding box.
14. The system of claim 1 wherein the particular user simultaneously couples multiple antennas, and further comprising:
   means for estimating a centroid of the plurality of antennas.
15. The system of claim 1 wherein each receiver capacitively coupled to a different user uses near field coupling, and frequencies of the uniquely identifiable signals are substantially under 1 MHz to maximize a signal to noise ratio at the receivers.
16. The system of claim 1 wherein another user touches the particular user while the particular user touches any of the plurality of antennas, and further comprising:
   means for associating the specific antenna with the particular user and the other user.
17. The system of claim 1 wherein the means for associating further comprises;
   means for generating orthogonal spreading codes in the transmitter;
   means for modifying the transmitted signals according to the spreading codes; and
   means for separating the transmitted signals according by correlation with the spreading codes.
18. The system of claim 17 further comprising:
   means for generating a pseudo random noise bit sequence using a polynomial function;
   a shift register coupled to the means for generating; and
   a plurality of taps coupled to the shift register to provide time delays of the pseudo random noise bit sequence and to modify the transmitted signals according to the time delayed pseudo random noise bit sequence.
19. The system of claim 1 wherein the plurality of antennas are a single resistive substrate, and a plurality of transmitters are coupled to the resistive substrate.
20. The system of claim 1 wherein the transmitted signals are driven in reverse by coupling one transmitter to each user, and coupling the antennas to a single receiver.
21. The system of claim 1 wherein each antenna is coupled to a unique transmitter and associated unique receiver to differentiate multiple simultaneous touches by a single user.
22. The system of claim 1 further including timing signals to differentiate multiple simultaneous touches by a single user.
23. A method for operating a multi-user touch system, comprising:
   transmitting uniquely identifiable signals to a plurality of antennas mounted on a surface;
   receiving the uniquely identifiable signals when users capacitively coupled the transmitted signal by touching the antennas; and
   associating specific touched antennas with particular users when multiple users simultaneously touch any of the plurality of antennas.
24. The method of claim 23 wherein the receivers are capacitively coupled to the users via conductive chairs.
25. The method of claim 23 wherein the capacitive coupling uses near field coupling, and frequencies of the uniquely identifiable signals are under 1 MHz to maximize a signal to noise ratio at the receivers.
26. The method of claim 23 wherein the plurality of antennas are mounted on a tabletop, and further comprising:
   projecting an image onto the tabletop.

* * * * *